L. J. P. De Mirimonde,

Journal Box,

№ 627, Reissued Nov. 23, 1858.

Witnesses.

Wm. H. Nichols

Thos. H. Jenkins

Inventor.

James. L. Deming

AM. PHOTO-LITHO. CO. N.Y. (OSBORNE'S PROCESS)

UNITED STATES PATENT OFFICE.

JAMES H. DEMING, OF NEW YORK, N. Y., ASSIGNEE OF LEON JOSEPH POMME DE MIRIMONDE, OF PARIS, FRANCE.

IMPROVEMENT IN REDUCING THE FRICTION OF JOURNALS OF AXLES ON RAILWAYS.

Specification forming part of Letters Patent No. 19,237, dated February 2, 1858; Reissue No. 627, dated November 23, 1858.

*To all whom it may concern:*

Be it known that LEON JOSEPH POMME DE MIRIMONDE, of Paris, France, has invented certain Improvements in Reducing the Friction of the Journals of Axles, of which the following is a full, clear, and exact description, reference being had to the accompanying drawings, making part of this specification, in which—

Figure 1:
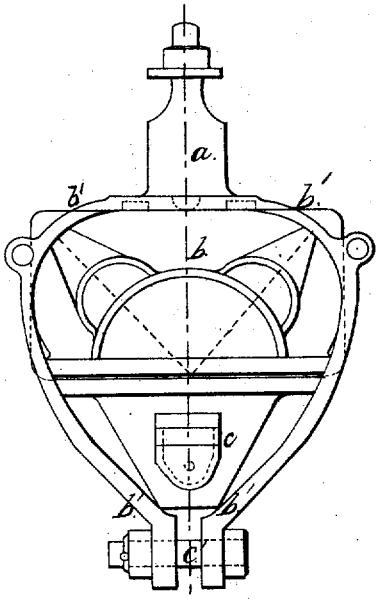
Figure 2:
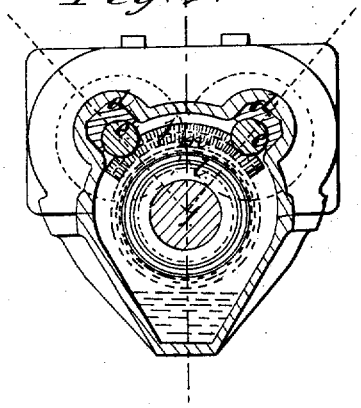
Figure 3:
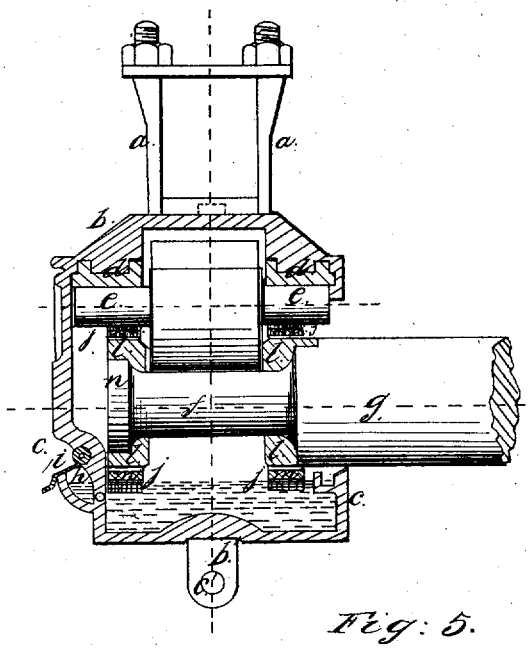

Figure 1 is a front elevation of my improvements as applied to railroad-axles; Fig. 2, a cross-section, and Fig. 3 a longitudinal section.

The said invention relates to the mounting of anti-friction rollers in boxes for reducing the friction of the journal of axles, and to a method of lubricating the journals of the anti-friction rollers and of the shaft.

Figure 4:
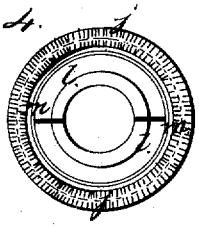
Figure 5:
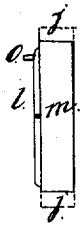

In the accompanying drawings, *b* and *c* represent a railroad-car box, and *a a* the straps between which the springs are placed; but this makes no part of the invention. The inside of the upper part, *b*, of the main box is formed with four journal-boxes, *d d d d*, fitted to receive the journals *e e* of two anti-friction rollers, and to rest like a saddle on the top of the said journals and leaving their under surface free that they may be lubricated, as will be presently described. The upper part of the box in this way rests on the journals of the anti-friction rollers, and the said rollers in turn rest on and straddle the journal *f* of the axle *g*, so that all the weight ultimately rests on the axle. The lower part, *c*, of the main box is properly secured to the upper part, *b*, by a hinged strap, *b'*, and bolt *c'*, or other suitable means, and, when secured, making one box, which entirely incloses the rollers and their journals and the journal *f* of the axle *g*, the body of the axle passing through one side of the box, which, if desired, may be there packed to prevent the entrance of dust, dirt, &c. The lower part, *c*, of the main box forms a reservoir for oil or other lubricating matter, which can be supplied through an aperture formed by a lip, *h*, covered by a spring-cap, *i*. The journal *f* of the axle should be formed to suit the length of the rollers—that is, the journal should be a little longer than the rollers—that they may be free to turn without contact with the shoulders thereof, and when the said invention is to be applied to old axles, or when the axle is not of a sufficient diameter, the shoulders each side of the rollers are formed each of a ring, *l*, fitted to the axle and cut in sections, as represented in Figs. 4 and 5, and then surrounded and confined by a hoop, *m*, and secured to the axle so as to rotate therewith. To the outside of each hoop *m* is fitted and secured a ring or hoop, *j*, of some suitable substance for taking up and applying oil or other lubricating matter. Some flexible material—such as felt or thick woolen cloth—is well adapted to this purpose, and such hoop or projection of the axle, at both ends of the rollers, must be such that as the axle rotates the periphery thereof shall dip in the lubricating matter and carry it up and apply it to the journals of the rollers, to keep them constantly lubricated. The inner edges or shoulders each side of the journal *f* should be beveled, so that the lubricating matter applied to the journals of the rollers may run down and thus lubricate in turn the surface of the journal *f* and the periphery of the rollers, thus effectually lubricating all the surfaces which are liable to wear and cut.

From the foregoing it will be seen that the journals of the rollers, which present the main wearing-surface, are entirely inclosed within the main box, and are thereby effectually protected against the action of dust and dirt, at the same time giving facility for strength in the construction and disposition of the parts; and, as the rollers are placed above and one on each side of the vertical plane of the axle-journal, the weight which they sustain cannot wedge them apart without breaking the main box in two, and by this arrangement the boxes for the journals of the rollers can be made so as merely to straddle the journals, leaving the portion of their surface which is toward the axis of the journal *f* entirely uncovered to receive the lubricating matter.

No claim is made herein to the application of anti-friction rollers to journals for the reduction of friction, nor to the use of a hollow box as a reservoir for oil or other lubricating matter, nor broadly to the use of a rotating body to carry up oil from a reservoir and apply it to the surface of a journal, as all these things were known before the invention intended to be claimed; but What I do claim as the invention of the said LEON JOSEPH POMME DE MIRIMONDE, and desire to be secured by Letters Patent, is—

1. The arrangement of the semi-boxes for resting on the journals of the friction-rollers within the upper part of the main journal-box, and entirely inclosed within the said main box, substantially as herein described, in combination with the axle-journal on which the rollers rest to sustain the load, as described.

2. Taking the lubricating matter from the lower part of the main box and applying it to the journals of the rollers by the projections at the ends of the axle journals.

3. The method of lubricating the journals of the rollers, and the periphery of the axle-journal and the rollers by the projections on the axle, which, in rotating, take the lubricating matter from the reservoir in the main box and apply it to the journals of the rollers above, that the drippings therefrom may lubricate the periphery of the rollers and axle-journal, substantially as described.

JAMES H. DEMING.

Witnesses:
WM. H. BISHOP,
THO. H. JENKINS.